United States Patent
Nguyen et al.

(10) Patent No.: US 9,683,167 B2
(45) Date of Patent: Jun. 20, 2017

(54) FIBERS AS DRAG-REDUCING PROPPING FIBERS IN LOW PERMEABILITY SUBTERRANEAN APPLICATIONS

(71) Applicant: Halliburton Energy Services, Inc., Houston, TX (US)

(72) Inventors: Philip D. Nguyen, Houston, TX (US); James William Ogle, Spring, TX (US); Ali Alwattari, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/783,387

(22) PCT Filed: Aug. 27, 2013

(86) PCT No.: PCT/US2013/056764
§ 371 (c)(1),
(2) Date: Oct. 8, 2015

(87) PCT Pub. No.: WO2015/030727
PCT Pub. Date: Mar. 5, 2015

(65) Prior Publication Data
US 2016/0053163 A1    Feb. 25, 2016

(51) Int. Cl.
*E21B 43/267* (2006.01)
*C09K 8/80* (2006.01)
(Continued)

(52) U.S. Cl.
CPC .................. *C09K 8/80* (2013.01); *C09K 8/68* (2013.01); *C09K 8/70* (2013.01); *C09K 8/805* (2013.01);
(Continued)

(58) Field of Classification Search
CPC ........ C09K 8/68; C09K 2208/28; C09K 8/80; C09K 8/805; E21B 43/267; E21B 43/26
See application file for complete search history.

(56) References Cited

U.S. PATENT DOCUMENTS

| | | |
|---|---|---|
| 5,277,973 A | 1/1994 | Yamamura et al. |
| 5,501,275 A | 3/1996 | Card et al. |
| (Continued) | | |

FOREIGN PATENT DOCUMENTS

| | | |
|---|---|---|
| EP | 0421944 A3 | 4/1991 |
| WO | 2015/030727 A1 | 3/2015 |

OTHER PUBLICATIONS

International Search Report and Written Opinion for PCT/US2013/056764 dated May 27, 2014.
(Continued)

*Primary Examiner* — Zakiya W Bates
(74) *Attorney, Agent, or Firm* — McDermott Will & Emery LLP

(57) ABSTRACT

Methods for treating a wellbore include providing a wellbore in a low permeability subterranean formation; providing a treatment fluid comprising an aqueous base fluid and drag-reducing propping fibers; introducing the treatment fluid into the wellbore at a rate and pressure sufficient to create or enhance at least one micro-fracture therein, wherein the drag-reducing propping fibers are capable of reducing the friction created within the treatment fluid as it is introduced into the wellbore; and placing the drag-reducing propping fibers into the at least one micro-fracture so as to prop open the micro-fracture.

19 Claims, 1 Drawing Sheet

(51) Int. Cl.
*C09K 8/68* (2006.01)
*C09K 8/70* (2006.01)
*E21B 43/26* (2006.01)

(52) U.S. Cl.
CPC .......... *E21B 43/26* (2013.01); *E21B 43/267* (2013.01); *C09K 2208/08* (2013.01); *C09K 2208/28* (2013.01)

(56) References Cited

U.S. PATENT DOCUMENTS

| | | |
|---|---|---|
| 7,665,522 B2 | 2/2010 | Sullivan et al. |
| 2008/0064614 A1 | 3/2008 | Ahrenst et al. |
| 2009/0042750 A1 | 2/2009 | Pauls et al. |
| 2012/0048555 A1 | 3/2012 | Hughes et al. |
| 2015/0072902 A1* | 3/2015 | Lafitte .................. C09K 8/035 507/112 |

OTHER PUBLICATIONS

Roy et al., "A Mean Flow Model for Polymer and Fiber Turbulent Drag Reduction," Applied Rheology, 2005.
Gillissen et al., "Fibre-induced drag reduction," Journal of Fluid Mechanics, 2007.
Cipolla et al., "The relationship Between Fracture complexity, Reservoir Properties, and Fracture-Treatment Design," SPE Productions and Operations, SPE 115769, , 2010.
Ogata et al., "Drag Reduction of Bacterial Cellulose Suspensions," Advances in Mechanical Engineering, 2011.
Delfos, et al., "Experiments on drag reduction by fibres in turbulent pipe flow," Delft Univ. of Technology, 2011.

* cited by examiner

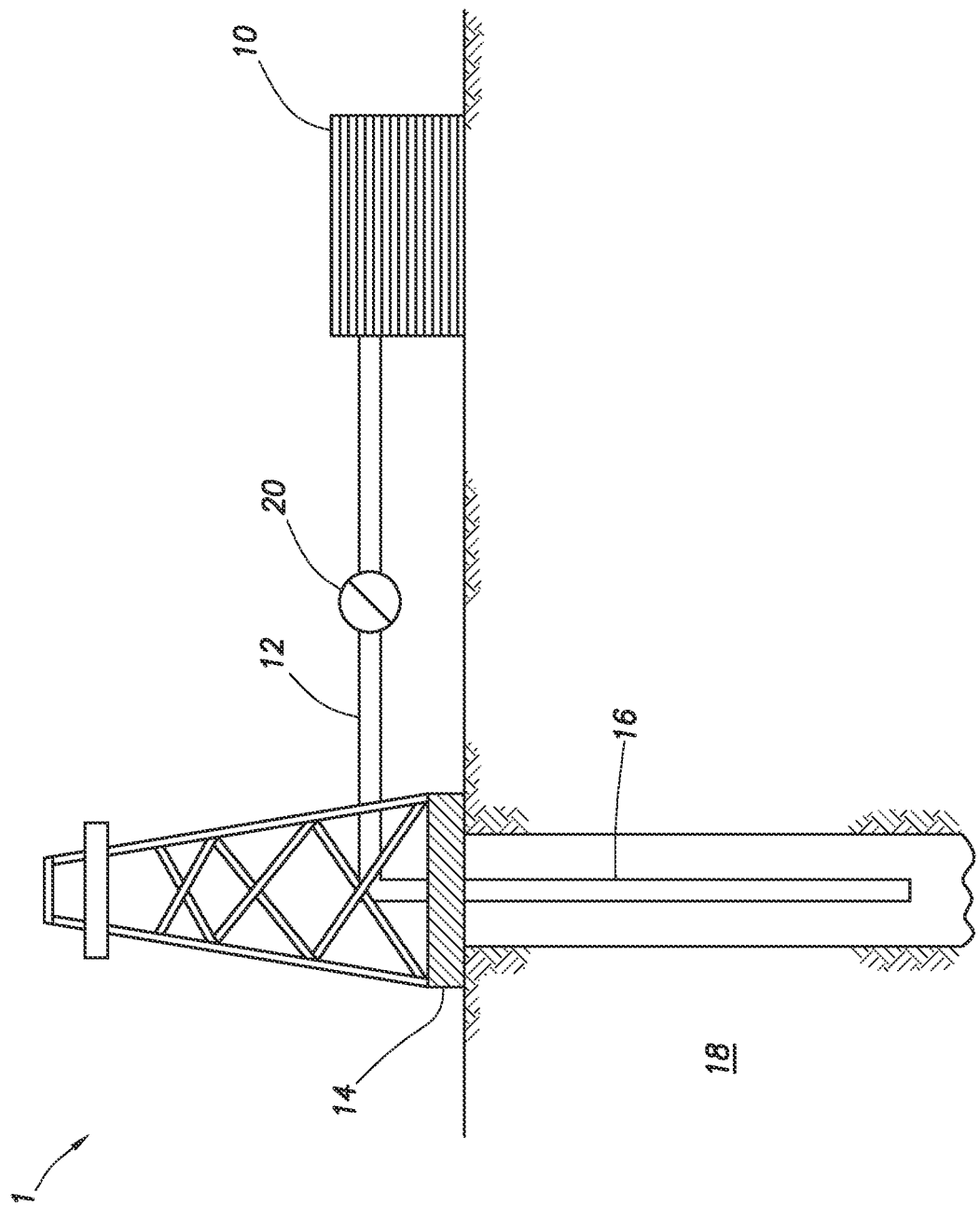

FIBERS AS DRAG-REDUCING PROPPING FIBERS IN LOW PERMEABILITY SUBTERRANEAN APPLICATIONS

BACKGROUND

At least some of the exemplary embodiments described herein relate to methods of using drag-reducing propping fibers as friction reducing agents and propping agents in low permeability subterranean formation operations, and treatment fluid compositions relating thereto.

Subterranean wells (e.g., hydrocarbon producing wells, gas producing wells, or water producing wells) are often stimulated by hydraulic fracturing treatments. In traditional hydraulic fracturing treatments, a treatment fluid, which may also function simultaneously or subsequently as a carrier fluid, is pumped into a portion of a subterranean formation at a rate and pressure sufficient to break down the formation and create one or more fractures therein. As used herein, the term "subterranean formation" and "formation" have the same meaning. Typically, particulate solids, such as graded sand, are suspended in a portion of the treatment fluid and then deposited into the fractures. The particulate solids, known as "proppant particulates," "proppant," or "propping particulates," serve to prevent the fractures from fully closing once the hydraulic pressure is removed. By keeping the fractures from fully closing, the proppant particulates aid in forming conductive paths through which fluids produced from the formation may flow. The degree of success of a stimulation operation depends, at least in part, upon the porosity of the interconnected interstitial spaces between abutting proppant particulates, through which fluids may flow.

In the case of stimulating low permeability formations, such as shale reservoirs or tight-gas sands, increasing fracture complexity during stimulation may enhance the production of the formation. Low permeability formations, as described herein, tend to have a naturally occurring network of multiple interconnected micro-sized fractures referred to as "fracture complexity." Such fracture complexity may be enhanced by stimulation (e.g., fracturing) operations to create new micro-fractures or enhance (e.g., elongate) existing micro-fractures. In such cases, the newly formed or enhanced micro-fractures may remain open without the assistance of proppant particulates due to imperfect closure of the micro-fractures after hydraulic pressure is removed. The inclusion of proppant particulates in these micro-fractures, new or natural, may increase permeability of the low permeability formation.

During subterranean formation operations (e.g., stimulation, proppant placement, and the like), aqueous treatment fluids are often pumped through tubulars (e.g., pipes, coiled tubing, etc.). A considerable amount of energy may be lost due to friction between the aqueous treatment fluid in turbulent flow and the formation, the wellbore, and or the tubulars located within the wellbore. For example, in stimulation operations, a treatment fluid may be viscosified and/or injected into a formation at a high flow rate to achieve sufficient fracturing and/or to serve as a carrier fluid. As the treatment fluid flows across the surfaces in the formation, the wellbore, and related tubulars, the frictional forces between the treatment fluid and surfaces are amplified relative to non-viscosified fluids under normal flow because of the increased viscosity or high flow rate of the treatment fluid. The amplified friction forces translate into a need for increasing the energy input to achieve the desired pressure and/or flow rate for the treatment fluid. Increasing energy input increases the cost of the fracturing operation. Moreover, the energy input necessary for stimulation of or proppant placement in low permeability formations that often require highly pressurized treatment fluids may be even more costly. As used herein, the term "wellbore" refers to wellbores of any configuration including, vertical wellbores and non-vertical wellbores (e.g., slant drilling of horizontal wells, and the like).

Accordingly, a need exists for a friction reducing agent that may also serve as a proppant particulate for use in low permeability subterranean formations.

BRIEF DESCRIPTION OF THE DRAWINGS

The following figures are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 provides an illustrative schematic of a system that can deliver treatment fluids of the embodiments described herein to a downhole location.

DETAILED DESCRIPTION

At least some of the exemplary embodiments described herein relate to methods of using drag-reducing propping fibers as friction reducing agents and propping agents in subterranean operations, and treatment fluid compositions relating thereto.

Increasing fracture complexity in low permeability subterranean formations may increase the conductivity and productivity of the formation. As used herein, the term "low permeability subterranean formation" or "low permeability formation" refers to formations having permeabilities of less than about 1 millidarcy ("mD") ($9.869233 \times 10^{-16}$ m$^2$). The permeability of a formation is a measure of the formation's resistance to through-flow fluid. That is, low permeability formations require considerable applied pressure in order to flow fluid through its pore spaces, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 mD ($9.869233 \times 10^{-19}$ m$^2$), and even as low as less than about 0.0001 mD ($9.869233 \times 10^{-20}$ m$^2$). Tight-gas sands are low permeability formations that produce mainly dry natural gas and may include tight-gas carbonates, tight-gas shales, coal-bed methane, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

The permeability values of the low permeability formations in some embodiments disclosed herein may be used to estimate the pore throat size of the formation. As used herein, the term "pore throat" refers to the narrow connection between two pores in a formation. As used herein, the term "pore" refers to the space between solid particles in a formation. The size of the pore throats of a formation may be used to estimate the size of propping particulates that may be effective to prop open at least a portion of the micro-fractures therein. Pore throat size may be estimated based on the square root of the permeability value of a formation.

Thus, because the permeability values of the low permeability formations of some embodiments described herein range from about 1 mD to about 0.0001 mD, the pore throat sizes range from about 1 micron to about 0.01 microns. The size of the propping particulates may be estimated at about 50 to 100 times the pore throat size, yielding a propping particulate size range of from about 0.1 micron to about 100 microns.

It should be noted that in some numerical listings of ranges, some lower limits listed may be greater than some upper limits listed. One skilled in the art will recognize that the selected subset will require the selection of an upper limit in excess of the selected lower limit.

Unless otherwise indicated, all numbers expressing quantities of ingredients, sizes, and so forth used in the present specification and associated claims are to be understood as being modified in all instances by the term "about." It should be noted that when "about" is provided herein at the beginning of a numerical list, "about" modifies each number of the numerical list. Accordingly, unless indicated to the contrary, the numerical parameters set forth in the following specification and attached claims are approximations that may vary depending upon the desired properties sought to be obtained by the disclosure. Some lower limits listed may be greater than some upper limits listed and one skilled in the art will recognize that the selected subset will require the selection of an upper limit in excess of the selected lower limit. At the very least, and not as an attempt to limit the application of the doctrine of equivalents to the scope of the claim, each numerical parameter should at least be construed in light of the number of reported significant digits and by application of ordinary rounding techniques.

One or more illustrative embodiments are presented below. Not all features of an actual implementation are described or shown in this application for the sake of clarity. It is understood that in the development of an actual embodiment of the disclosure, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

The low permeability formations in some embodiments disclosed herein may be stimulated so as to create or enhance new or existing micro-fractures therein and increase fracture complexity, which, in turn, may increase fluid production. In some embodiments disclosed herein, a method is provided comprising treating a wellbore in a low permeability subterranean formation by introducing into the wellbore a treatment fluid comprising an aqueous base fluid and drag-reducing propping fibers at a rate and pressure sufficient to create or enhance at least one micro-fracture therein. The drag-reducing propping fibers are capable of reducing the friction created within the treatment fluid as it is introduced into the wellbore and are placed within the micro-fracture so as to prop it open. As such, the drag-reducing propping fibers are capable of both acting as proppant particulates and friction reducing agents. In other embodiments disclosed herein, a method is provided comprising treating a wellbore in a low permeability subterranean formation by introducing a substantially solids-free pad fluid comprising a first aqueous base fluid into the wellbore at a rate and pressure sufficient to create or enhance at least one micro-fracture therein. Thereafter, a treatment fluid comprising a second aqueous base fluid and drag-reducing propping fibers is introduced into the wellbore. The drag-reducing propping fibers are capable of reducing the friction created within the treatment fluid as it is introduced into the wellbore and are placed within the micro-fracture so as to prop it open. As used herein, the term "substantially solids-free pad fluid" refers to a fluid having insoluble particulates comprising less than about 10%, 9%, 8%, 7%, 6%, 5%, 4%, 3%, 1%, or 0.1% by volume of the fluid.

The drag-reducing propping fibers of the embodiments described herein are particularly advantageous due to their novel shape for use as a dual propping agent and friction reducing agent. The drag-reducing propping fibers may have a cross-section width in the range of about 0.1 microns; 1 micron; 10 microns; 20 microns; 30 microns; 40 microns; and 50 microns to an upper limit of about 100 microns; 90 microns; 80 microns; 70 microns; 60 microns; and 50 microns. As used herein, the term "cross-section width" refers to the width or diameter taken from the traverse plane of the drag-reducing fiber. The drag-reducing propping fibers may additionally have a length in the range of from a lower limit of about 0.1 mm; 0.5 mm; 1 mm; 1.5 mm; 2 mm; 2.5 mm; 3 mm; 3.5 mm; 4 mm; 4.5 mm; and 5 mm to an upper limit of about 10 mm; 9.5 mm; 9 mm; 8.5 mm; 8 mm; 7.5 mm; 7 mm; 6.5 mm; 6 mm; 5.5 mm; and 5 mm. Thus, the average length-to-diameter aspect ratio of the drag-reducing propping fibers described in some embodiments herein may be in the range of from a lower limit of about 0.1 mm/micron; 1 mm/micron; 10 mm/micron; 20 mm/micron; 30 mm/micron; 40 mm/micron; and 50 mm/micron to an upper limit of about 100 mm/micron; 90 mm/micron; 80 mm/micron; 70 mm/micron; 60 mm/micron; and 50 mm/micron. In some embodiments, the drag-reducing propping fibers may have an average length-to-diameter aspect ratio in the range of from about 0.2 mm/micron to about 50 mm/micron.

The shape of the novel drag-reducing propping fibers (e.g., the presence of a length-to-diameter aspect ratio) disclosed in some embodiments herein allow them to uniquely orient such that they are able to self-align in flow. As used herein, the term "self-align in flow" and all of its variants refers to the orientation of the drag-reducing propping fibers in the same directional plane during flow of the treatment fluid in which they are located (e.g., when the treatment fluid encounters friction). This alignment may enhance the friction reducing properties of the drag-reducing propping fibers as such orientation may permit surfaces that encounter the drag-reducing propping fibers (e.g., a subterranean formation wellbore, drilling equipment, pumping equipment, and the like) to encounter an increased surface area of the drag-reducing propping fibers than would be the case if the drag-reducing propping fibers were not aligned.

Additionally, the geometry or shape of the drag-reducing propping fibers is particularly well suited for placement and retention within the micro-fractures without bridging or screening out, reducing the likelihood that a portion of the micro-fracture may close and reduce the conductivity of the formation.

The drag-reducing propping fibers described herein may be an organic polymer; an inorganic polymer; and any combination thereof. Suitable drag-reducing propping fibers may be of materials including, but not limited to, polycaprolactam (also referred to as Nylon 6); polyhexamethylene adiamide (also referred to as Nylon 66); acrylic; polyphenylene oxide; acrylonitrile butadiene styrene; ethylene vinyl alcohol; polycarbonate; polyethylene terephthalate; polybutylene terephthalate; glycol-modified polyethylene terephthalate; polyetherimide; polyphenylene ether; polyphenylene sulfide; polystyrene; polyvinylbenzene; acrylonitrile butadiene styrene; polyvinylchloride; fluoroplastic; polysulfide; polypropylene; styrene acrylonitrile; phenylene oxide; polyolefin; polystyrene divinylbenzene; polyfluorocarbon; polyether etherketone; polyamide imide; and any combination thereof.

In some embodiments, the drag-reducing propping fibers may be a filler material coated with any organic polymer or inorganic polymer, provided that the coated filler material has or can be amended to take on the shape and size of the drag-reducing propping fibers described herein. The organic polymer or inorganic polymer may be selected from any of those mentioned above that may be used alone as a drag-reducing propping fiber, provided that it is able to be coated upon a clay or a clay derivative. Suitable filler materials include, but are not limited to, clay; silica; alumina; fumed carbon; carbon black; graphite; mica; titanium dioxide; meta-silicate; calcium silicate; calcine; kaolin; talc; zirconia; boron; fly ash; hollow glass microspheres; solid glass; and any combination thereof.

These drag-reducing propping fiber materials may be molded (e.g., molded polyphenylene sulfide), heat resistant (e.g., heat resistant grade polystyrene), unreinforced (e.g., unreinforced polycarbonate), or any other modification that is amendable to the shape and size of the drag-reducing propping fibers disclosed herein. Examples of combinations of materials that may be used to form the drag-reducing propping fibers described herein may include, but are not limited to, a blend of polyphenylene oxide and polyhexamethylene adiamide, a blend of polycarbonate and polyethylene terephthalate, and a blend of polycarbonate and polybutylene terephthalate.

In some embodiments, the drag-reducing propping fibers may be included in the treatment fluid in an amount in the range of from about 0.001% to about 5% by weight of the treatment fluid, including a lower limit of about 0.001 w/w %, 0.01 w/w %, 0.1 w/w %, 0.05 w/w %, 0.1 w/w %, 0.25 w/w %, 0.5 w/w %, or 1.0 w/w % to an upper limit of about 5.0 w/w %, 4.5 w/w %, 4.0 w/w %, 3.5 w/w %, 3.0 w/w %, 2.5 w/w %, 2.0 w/w %, or 1.5 w/w %, and from any lower limit to any upper limit encompassed by any subset therebetween. One skilled in the art with the benefit of this disclosure should recognize that the concentration of the drag-reducing propping fibers may depend on, inter alia, the composition of the drag-reducing propping fiber, the composition of the base fluid, the other components of the treatment fluid (e.g., inclusion of a foaming agent, a gas, or a gelling agent), and the like, and any combination thereof.

In some embodiments, the drag-reducing propping fibers may be coated so as to render at least a portion of their surface hydrophobic, or more hydrophobic than without the coating. The coating may beneficially increase the friction reducing character of the drag-reducing fibers and may additionally enhance recovery of the treatment fluids described herein, which may improve well fluid production (e.g., hydrocarbon production). As used herein, the term "coating" refers to at least a partial coating on the surface of the drag-reducing propping fibers and does not suggest or imply that 100% coverage is required.

The hydrophobic coating agents for use in conjunction with the methods described herein may be any hydrophobic coating agent capable of forming a hydrophobic coating on the surface of the drag-reducing propping fibers. Suitable hydrophobic coating agents may include, but are not limited to, a polyamide; a polycarbamate; a natural resin; a reaction product of a compound having a chlorosilyl group and an alkylsilane; a polymer of a silane compound having a fluoroalkyl group; a blend of a polyamide, isopropyl alcohol, and a cocodiamene surfactant; a lecithin; and any combination thereof.

In some embodiments, the drag-reducing propping fibers may be supplemented with micro-degradable particulates. These micro-degradable particulates may beneficially be placed into the micro-fractures of the low permeability subterranean formations disclosed herein with the drag-reducing propping fibers and aid in maintaining the micro-fractures open after pressure is removed in the formation. Thereafter, the micro-degradable particulates may be degraded so as to create conductive channels between individual or groups of drag-reducing propping fibers and permit fluid flow during production (e.g., hydrocarbon production).

In some embodiments, the micro-degradable particulates are oil-degradable materials. In such cases, in the event that closure of the micro-fracture(s) undesirably compacts the drag-reducing propping fibers (thus undesirably reducing the conductivity of the micro-fracture(s)), the oil-degradable micro-degradable particulates may be degraded by produced hydrocarbon fluids, thus restoring at least some permeability. The oil-degradable micro-degradable particulates may also be degraded by materials purposely placed in the formation by injection, mixing them with delayed reaction degradation agents, or other suitable means to induce degradation.

Suitable micro-degradable particulates that are oil-degradable include oil-degradable polymers. Oil-degradable polymers that may be used in accordance with the embodiments herein may be either natural or synthetic polymers. Some particular examples include, but are not limited to, polyacrylics; polyamides; polyolefins (e.g., polyethylene, polypropylene, polyisobutylene, and polystyrene); and any combination thereof. Other suitable oil-degradable polymers include those that have a melting point that is such that the polymer will dissolve at the temperature of the subterranean formation in which it is placed, such as a wax material.

In addition to oil-degradable polymers, other degradable materials that may be used as the micro-degradable particulates disclosed herein may include, but are not limited to, degradable polymers; dehydrated salts; and/or mixtures of the two. As for degradable polymers, a polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, orientation, and the like), hydrophilicity, hydrophobicity, surface area, additives, and the like. Also, the environment to which the polymer is subjected may affect how it degrades (e.g., temperature, presence of moisture, oxygen, microorganisms, enzymes, pH, and the like).

Suitable examples of degradable polymers that may be used as micro-degradable particulates in accordance with the embodiments described herein include polysaccharides such as dextran or cellulose; chitins; chitosans; proteins; aliphatic polyesters; poly(lactides); poly(glycolides); poly(E-caprolactones); poly(hydroxybutyrates); poly(anhydrides); aliphatic or aromatic polycarbonates; poly(orthoesters); poly (amino acids); poly(ethylene oxides); and polyphosphazenes. Of these suitable polymers, aliphatic polyesters and polyanhydrides may be preferred.

Polyanhydrides are another type of particularly suitable degradable polymer useful as the micro-degradable particulates in the embodiments described herein. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include, but are not limited to, poly(adipic anhydride); poly(suberic anhydride); poly(sebacic anhydride); poly(dodecanedioic anhydride); poly(maleic anhydride); poly(benzoic anhydride); and any combination thereof.

Dehydrated salts may be used in accordance with the embodiments herein as micro-degradable particulates. A dehydrated salt is suitable for use in the embodiments disclosed herein if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax); anhydrous boric acid; and any combination thereof. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts, such as acetate trihydrate.

Blends of certain degradable materials may also be suitable for use as micro-degradable particulates. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the micro-fracture(s) or with the production of any of the fluids from the subterranean formation.

In choosing the appropriate degradable material, one should consider the degradation products that will result. These degradation products should not adversely affect other operations or components and may even be selected to improve the long-term performance/conductivity of the propped micro-fractures. The choice of degradable material also can depend, at least in part, on the conditions of the well (e.g., well bore temperature). For instance, lactides have been found to be suitable for lower temperature wells, including those within the range of 60-150° F. (15.6-65.6° C.), and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, a preferable result is achieved if the micro-degradable particulates degrade slowly over time as opposed to instantaneously. Even more preferable results have been obtained when the degradable material does not begin to degrade until after the proppant matrix has developed some compressive strength. The slow degradation of the degradable material, in situ, helps to maintain the stability of the proppant matrix.

It is desirable that the degradable particulate has similar particle size and specific gravity as those of the drag-reducing propping fibers so as to enhance the distribution of micro-degradable particulates among the drag-reducing propping fibers and to minimize the segregation between micro-degradable particulates and the drag-reducing propping fibers. Thus, the micro-degradable particulates preferably have a cross-section width in the range of from about 0.1 micron to about 100 microns. In preferred embodiments, the micro-degradable particulates are also similarly shaped to the drag-reducing propping fibers, and thus may have a length in the range of from a lower limit of about 0.1 mm; 1 mm; 2 mm; 3 mm; 4 mm; and 5 mm to an upper limit of about 10 mm; 9 mm; 8 mm; 7 mm; 6 mm; and 4 mm and an average length-to-diameter aspect ratio in the range or a lower limit of about 0.1 mm/micron; 1 mm/micron; 10 mm/micron; 20 mm/micron; 30 mm/micron; 40 mm/micron; and 50 mm/micron to an upper limit of about 100 mm/micron; 90 mm/micron; 80 mm/micron; 70 mm/micron; 60 mm/micron; and 50 mm/micron.

In some embodiments, the micro-degradable particulates may be present in the treatment fluids in an amount in the range of from about 0.001% to about 2% by weight of the treatment fluid. One of ordinary skill in the art with the benefit of this disclosure will recognize an optimum concentration of micro-degradable particulates that provides desirable values in terms of enhanced conductivity or permeability without undermining the purpose and function of the drag-reducing propping fibers or the micro-fracture stability itself The treatment fluids and the substantially solids-free pad fluid for use in conjunction with the methods described herein comprise an aqueous base fluid. In some embodiments, the aqueous base fluid of the substantially solids-free pad fluid may be the same or different from the aqueous base fluid of the treatment fluid. Suitable aqueous-based fluids may include, but are not limited to, fresh water; saltwater (e.g., water containing one or more salts dissolved therein); brine (e.g., saturated salt water); seawater; and any combination thereof. In some embodiments, the aqueous-based fluid may further comprise aqueous-miscible fluids, which may include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; and any combination thereof. One of ordinary skill in the art, with the benefit of this disclosure, should recognize that higher concentrations of some aqueous-miscible fluids may cause the drag-reducing propping fibers described herein to precipitate or flocculate. As such, aqueous-miscible fluids may, in some embodiments, be included in the treatment fluids described herein at a low concentration.

In some embodiments, the treatment fluid comprising the drag-reducing propping fibers may be foamed or gelled, so as to enhance suspension of the drag-reducing propping fibers. It is notable, however, that the shape of the drag-reducing propping fibers allows their suspension without the need of a foamed or gelled treatment fluid. Nevertheless, one of ordinary skill in the art may find it beneficial, such as, for example, if the drag-reducing propping fibers selected have a high density compared to the treatment fluid they are in to foam or gel the fluid.

As used herein the term "foam" refers to a two-phase composition having a continuous liquid phase and a discontinuous gas phase. In some embodiments, the treatment fluids described herein may comprise an aqueous base fluid, a gas, a foaming agent, and drag-reducing propping fibers.

Suitable gases may include, but are not limited to, nitrogen; carbon dioxide; air; methane; helium; argon; and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen foams so that the surface pumping pressure required to reach a corresponding depth is lower with carbon dioxide than with nitrogen. Moreover, the higher density may impart greater drag-reducing propping fiber transport capability.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompasses any subset therebetween. Preferably, the foamed treatment fluid may have a foam quality from about 85% to about 95%, or about 90% to about 95%.

Suitable foaming agents may include, but are not limited to, cationic foaming agents; anionic foaming agents; amphoteric foaming agents; nonionic foaming agents; or any combination thereof. Nonlimiting examples of suitable foaming agents may include, but are not limited to, surfactants like betaines; sulfated or sulfonated alkoxylates; alkyl quarternary amines; alkoxylated linear alcohols; alkyl sulfonates; alkyl aryl sulfonates; $C_{10}$-$C_{20}$ alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; and any combination thereof. Foaming agents may be included in treatment fluids at concentrations ranging typically from a lower limit of about 0.05%; 0.1%; 0.2%; 0.3%; 0.4%; 0.5%; 0.6%; 0.7%; 0.8%; 0.9%; and 1% to an upper limit of about 2%; 1.9%; 1.8%; 1.7%; 1.6%; 1.5%; 1.4%; 1.3%; 1.2%; 1.1%; and 1% of the liquid component by weight (corresponding to about 0.5 to about 20 gallons per 1000 gallons of liquid).

The treatment fluids described herein may, in some instances, be gelled. In some embodiments, the treatment fluids described herein may comprise an aqueous base fluid, a gelling agent, and drag-reducing propping fibers.

Suitable gelling agents may comprise any substance (e.g., a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; or a combination thereof. The gelling agents also may be cationic gelling agents; anionic gelling agents; and any combination thereof. Suitable gelling agents may include, but are not limited to, polysaccharides; biopolymers; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose ("CMC"), and carboxymethylhydroxyethylcellulose); xanthan; scleroglucan; succinoglycan; diutan; and any combination thereof. In certain embodiments, the gelling agents comprise an organic carboxylated polymer, such as CMHPG.

Suitable synthetic polymers include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido-and methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount sufficient to provide the desired viscosity while not exceeding a concentration that quenches the advantages and function of the drag-reducing propping fibers describe herein. The appropriate concentration for the gelling agent may depend on, inter alia, the composition and molecular weight of the gelling agent, the composition of the drag-reducing propping fibers, and the like, and any combination thereof. For example, the concentration at which a guar-based gelling agent quenches the function of the drag-reducing propping fibers may be lower than the concentration for a CMC gelling agent. In some embodiments, the gelling agents may be present in treatment fluids described herein in an amount ranging from a lower limit of about 0.05%, 0.1%, 0.25%, 1%, or 2.5% by weight of the treatment fluid to an upper limit of about 10%, 8%, 5%, or 2.5% by weight of the treatment fluid, and wherein the concentration may range from any lower limit to any upper limit and encompasses any subset therebetween (e.g., about 0.15% to about 2.5%).

In some embodiments, the treatment fluids may further comprise a mineral fines stabilizing agent. As used herein, the term "mineral fines stabilizing agent" refers to a chemical substance capable of absorbing on formation surfaces, altering the surface properties of the formation (e.g., clay, silica, carbonate, hematite, magnetite, siderite, and the like), and reducing their interaction with flowing fluids to prevent swelling, dispersion, and/or migration during subterranean formation operations.

Examples of suitable mineral fines stabilizing agents for use in the treatment fluids described herein include, but are not limited to, an acrylic acid polymer; an acrylic acid ester polymer; an acrylic acid derivative polymer; an acrylic acid homopolymer; an acrylic acid ester homopolymer (e.g., poly(methyl acrylate), poly(butyl acrylate), and poly(2-ethylhexyl acrylate)); an acrylic acid ester co-polymer; a methacrylic acid derivative polymer; a methacrylic acid homopolymer; a methacrylic acid ester homopolymer (e.g., poly(methyl methacrylate), poly(butyl methacrylate), and poly(2-ethylhexyl methacrylate)); an acrylamido-methyl-propane sulfonate polymer; an acrylamido-methyl-propane sulfonate derivative polymer; an acrylamido-methyl-propane sulfonate co-polymer; an acrylic acid/acrylamido-methyl-propane sulfonate co-polymer; a bisphenol A diglycidyl ether resin; a butoxymethyl butyl glycidyl ether resin; a bisphenol A-epichlorohydrin resin; a bisphenol F resin; a polyepoxide resin; a novolak resin; a polyester resin; a phenol-aldehyde resin; a urea-aldehyde resin; a furan resin; a urethane resin; a glycidyl ether resin; an epoxide resin; polyacrylamide; partially hydrolyzed polyacrylamide; a copolymer of acrylamide and acrylate; a carboxylate-containing terpolymer; a tetrapolymer of acrylate; galactose; mannose; glucoside; glucose; xylose; arabinose; fructose; glucuronic acid; pyranosyl sulfate; guar gum; locust bean gum; tara gum; konjak; tamarind; starch; cellulose; karaya; xanthan; tragacanth; carrageenan; a polycarboxylate (e.g., a polyacrylate, a polymethacrylate, and the like); a methylvinyl ether polymer; polyvinyl alcohol; polyvinylpyrrolidone; any derivatives thereof; and any combination thereof.

Examples of suitable commercially available mineral fines stabilizing agents for use in the methods described herein include, but are not limited to, CLA-STA® XP, a water-soluble cationic oligomer (available from Halliburton Energy Services, Inc. in Houston, Tex.) and CLA-WEB®, a stabilizing additive (available from Halliburton Energy Services, Inc. in Duncan, Okla.).

Because the treatment fluids disclosed herein are used to treat low permeability formations, the mineral fines stabilizing agents are preferably in liquid form or micro-particulate form, having a cross-section width of from about 0.1 microns to about 100 microns. When the mineral fines stabilizing agent chosen is in liquid form, it may be present in the treatment fluids in an amount in the range of from a lower limit of about 0.5 v/v %; 1 v/v %; 5 v/v %; 10 v/v %; and 15 v/v % to an upper limit of about 30 v/v %; 25 v/v %; 20 v/v %; 15 v/v %; and 10 v/v %. When the mineral fines stabilizing agent chosen is in micro-particulate form, it may be present in the treatment fluids in an amount in the range of a lower limit of about 1 pounds per barrel ("lb/bbl"); 5 lb/bbl; 10 lb/bbl; 20 lb/bbl; 30 lb/bbl; 40 lb/bbl; and 50 lb/bbl to an upper limit of about 100 lb/bbl; 90 lb/bbl; 80 lb/bbl; 70 lb/bbl; 60 lb/bbl; and 50 lb/bbl (corresponding to about 2.85 kg/m$^3$ to about 285 kg/m$^3$). One of ordinary skill in the art, with the benefit of this disclosure, will recognize the concentration of mineral fines stabilizing agent to use in a particular operation to achieve the desired result. Factors that may affect the concentration of mineral fines stabilizing agent may include, but are not limited to, the type and condition of the low permeability formation being treated, the flow rate of the treatment fluid to be used during treatment, and the like.

In some embodiments, the treatment fluid and/or substantially solids-free pad fluid of the methods disclosed herein may further comprise an additive. Any additive may be used in the substantially solids-free pad fluid so long as they do not cause the substantially-free pads fluid to contain insoluble particulates in an amount of greater than 10% by volume. Suitable additives may include, but are not limited to, a salt; a weighting agent; an inert solid; a dispersion aid; a corrosion inhibitor; a surfactant; a lost circulation material; a pH control additive; a breaker; a biocide; a crosslinker; a scale inhibitor; and any combination thereof. One of ordinary skill in the art should understand which additives, and at what concentration, should be included in the treatment fluid and/or substantially solids-free pad fluid for use in a desired method, without interfering with the disclosed purpose of the two fluids.

In some embodiments, the treatment fluids comprising the drag-reducing propping fibers may be useful in a plurality of subterranean operations where friction reduction is desired, like stimulation operations (e.g., fracturing treatments, acidizing treatments, or fracture acidizing treatments), and completion operations. In some embodiments, the treatment fluids described herein may be used for a high-rate water fracturing operation, also known as a "slickwater" fracturing operation. As will be appreciated by those of ordinary skill in the art, fracturing fluids used in these operations are generally not gelled, although gelling agents may be included at low concentrations (e.g., about 0.5% by weight of the treatment fluid or less). As such, in high-rate water fracturing, fluid velocity rather than viscosity is relied on for formation fracturing, fracture propagation, and proppant transport. The use of the drag-reducing propping fibers as dual friction reducing agents and propping agents in such operations may advantageously allow for higher fluid flow rates, thereby increasing the efficiency and efficacy of the operation. Typically, the treatment fluids utilized in high-rate water fracturing operations have a viscosity of about 0.7 cP to about 10 cP.

In various embodiments, systems configured for delivering the treatment fluids described herein to a downhole location are described. In various embodiments, the systems can comprise a pump fluidly coupled to a tubular, the tubular containing a treatment fluid comprising an aqueous base fluid and drag-reducing propping fibers.

The pump may be a high pressure pump in some embodiments. As used herein, the term "high pressure pump" will refer to a pump that is capable of delivering a fluid downhole at a pressure of about 1000 psi (6.59 MPa) or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi (6.59 MPa) or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of some embodiments described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a wellbore in a low permeability subterranean formation; providing a treatment fluid comprising an aqueous base fluid and drag-reducing propping fibers; introducing the treatment fluid into the wellbore at a rate and pressure sufficient to create or enhance at least one micro-fracture therein, wherein the drag-reducing propping fibers are capable of reducing the friction created within the treatment fluid as it is introduced into the wellbore; and placing the drag-reducing propping fibers into the at least one micro-fracture so as to prop open the micro-fracture.

B. A method comprising: providing a wellbore in a low permeability subterranean formation; providing a substantially solids-free pad fluid comprising a first aqueous base fluid; providing a treatment fluid comprising a second aqueous base fluid and drag-reducing propping fibers; introducing the substantially solids-free pad fluid into the wellbore at a rate and pressure sufficient to create or enhance at least one micro-fracture therein; introducing the treatment fluid into the wellbore, wherein the drag-reducing propping fibers are capable of reducing the friction created within the treatment fluid as it is introduced into the wellbore; and placing the drag-reducing propping fibers into the at least one micro-fracture so as to prop open the micro-fracture.

Each of embodiments A and B may have one or more of the following additional elements in any combination:

Element 1: Wherein the drag-reducing propping fibers have a cross-section width in the range of from about 0.1 micron to about 100 microns.

Element 2: Wherein the drag-reducing propping fibers have a length in the range of from about 0.1 mm to about 10 mm.

Element 3: Wherein the drag-reducing propping fibers have an average length-to-diameter aspect ratio in the range of from about 0.10 mm/micron to about 100 mm/micron.

Element 4: Wherein the drag-reducing propping fibers are present in an amount in the range of from about 0.001% to about 5% by weight of the treatment fluid.

Element 5: Wherein the drag-reducing propping fibers comprise an organic polymer; an inorganic polymer; filler material coated with an organic polymer; filler material coated with an inorganic polymer; and any combination thereof.

Element 6: Wherein the treatment fluid further comprises a mineral fines stabilizing agent.

Element 7: Wherein the treatment fluid further comprises a mineral fines stabilizing agent selected from the group consisting of a liquid mineral fines stabilizing agent; a micro-particulate mineral fines stabilizing agent having a cross-section width in the range of from about 0.1 microns to about 100 microns; and any combination thereof.

Element 8: Wherein the treatment fluid further comprises micro-degradable particulates, wherein the micro-degradable particulates have a cross-section width in the range of from about 0.1 micron to about 100 microns.

Element 9: Wherein the drag-reducing propping fibers are coated with a hydrophobic coating agent so as to render at least a portion of a surface of the drag-reducing propping fibers hydrophobic.

By way of non-limiting example, exemplary combinations applicable to A, B, C include: A with 1 and 2; A with 7 and 9; B with 1, 2, 3, and 5; and B with 4, 6, and 8.

Therefore, the embodiments herein are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a wellbore in a low permeability subterranean formation;
providing a treatment fluid comprising an aqueous base fluid and drag-reducing propping fibers;
introducing the treatment fluid into the wellbore at a rate and pressure sufficient to create or enhance at least one micro-fracture therein,
wherein the drag-reducing propping fibers are capable of reducing the friction created within the treatment fluid as it is introduced into the wellbore,
wherein the drag-reducing propping fibers are present in an amount in the range of from about 1.0% to about 5.0% by weight of the treatment fluid; and
placing the drag-reducing propping fibers into the at least one micro-fracture so as to prop open the micro-fracture.

2. The method of claim 1, wherein the drag-reducing propping fibers have a cross-section width in the range of from about 0.1 micron to about 100 microns.

3. The method of claim 1, wherein the drag-reducing propping fibers have a length in the range of from about 0.1 mm to about 10 mm.

4. The method of claim 1, wherein the drag-reducing propping fibers have an average length-to-diameter aspect ratio in the range of from about 0.10 mm/micron to about 100 mm/micron.

5. The method of claim 1, wherein the drag-reducing propping fibers comprise an organic polymer; an inorganic polymer; filler material coated with an organic polymer; filler material coated with an inorganic polymer; or any combination thereof.

6. The method of claim 1, wherein the treatment fluid further comprises a mineral fines stabilizing agent.

7. The method of claim 6, wherein the mineral fines stabilizing agent is selected from the group consisting of a liquid mineral fines stabilizing agent; a micro-particulate mineral fines stabilizing agent having a cross-section width in the range of from about 0.1 microns to about 100 microns; and any combination thereof.

8. The method of claim 1, wherein the treatment fluid further comprises micro-degradable particulates, wherein the micro-degradable particulates have a cross-section width in the range of from about 0.1 micron to about 100 microns.

9. The method of claim 1, wherein the drag-reducing propping fibers are coated with a hydrophobic coating agent so as to render at least a portion of a surface of the drag-reducing propping fibers hydrophobic.

10. A method comprising:
providing a wellbore in a low permeability subterranean formation;
providing a substantially solids-free pad fluid comprising a first aqueous base fluid;
providing a treatment fluid comprising a second aqueous base fluid and drag-reducing propping fibers;
introducing the substantially solids-free pad fluid into the wellbore at a rate and pressure sufficient to create or enhance at least one micro-fracture therein;
introducing the treatment fluid into the wellbore,
wherein the drag-reducing propping fibers are capable of reducing the friction created within the treatment fluid as it is introduced into the wellbore; and
placing the drag-reducing propping fibers into the at least one micro-fracture so as to prop open the micro-fracture.

11. The method of claim 10, wherein the drag-reducing propping fibers have a cross-section width in the range of from about 0.1 microns to about 100 microns.

12. The method of claim 10, wherein the drag-reducing propping fibers have a length in the range of from about 0.1 mm to about 10 mm.

13. The method of claim 10, wherein the drag-reducing propping fibers have an average length-to-diameter aspect ratio in the range of from about 0.1 mm/micron to about 100 mm/micron.

14. The method of claim 10, wherein the drag-reducing propping fibers are present in an amount in the range of from about 0.001% to about 5% by weight of the treatment fluid.

15. The method of claim 10, wherein the drag-reducing propping fibers comprise an organic polymer; an inorganic polymer; filler material coated with an organic polymer; filler material coated with an inorganic polymer; or any combination thereof.

16. The method of claim 10, wherein the treatment fluid further comprises a mineral fines stabilizing agent.

17. The method of claim 16, wherein the mineral fines stabilizing agent is selected from the group consisting of a liquid mineral fines stabilizing agent; a micro-particulate mineral fines stabilizing agent having a cross-section width in the range of from about 0.1 microns to about 100 microns; and any combination thereof.

18. The method of claim 10, wherein the treatment fluid further comprises micro-degradable particulates, wherein the micro-degradable particulates have a cross-section width in the range of from about 0.1 micron to about 100 microns.

19. The method of claim 10, wherein the drag-reducing propping fibers are coated with a hydrophobic coating agent so as to render at least a portion of a surface of the drag-reducing propping fibers hydrophobic.

* * * * *